US006703141B1

(12) United States Patent
Lu et al.

(10) Patent No.: US 6,703,141 B1
(45) Date of Patent: Mar. 9, 2004

(54) MATTE SURFACE FILM

(75) Inventors: Pang-Chia Lu, Pittsford, NY (US); Lyle J. Harley, Newark, NY (US); Francis D. Tran, Cumming, GA (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/457,637

(22) Filed: Dec. 9, 1999

(51) Int. Cl.$^{7}$ .......................... B32B 27/08; B29C 47/06

(52) U.S. Cl. ....................... 428/515; 428/516; 428/520; 264/173.12; 264/173.15; 264/173.16

(58) Field of Search ................................ 428/500, 515, 428/516, 910, 520; 264/173.15, 173.12, 173.16

(56) References Cited

U.S. PATENT DOCUMENTS

| | | | | | |
|---|---|---|---|---|---|
| 4,410,482 | A | | 10/1983 | Subramanian | 264/515 |
| 4,692,379 | A | * | 9/1987 | Keung et al. | 428/349 |
| 5,274,030 | A | * | 12/1993 | Audry et al. | 428/516 |
| 5,326,625 | A | * | 7/1994 | Schuhmann et al. | 428/516 |
| 5,364,704 | A | | 11/1994 | Murschall et al. | 428/516 |
| 5,492,757 | A | | 2/1996 | Schuhmann et al. | 428/329 |
| 5,494,717 | A | | 2/1996 | Peiffer et al. | 428/34.9 |
| 5,496,600 | A | | 3/1996 | Peiffer et al. | 428/35.7 |
| 5,516,563 | A | | 5/1996 | Schumann et al. | 428/34.2 |
| 5,618,369 | A | | 4/1997 | Peiffer et al. | 156/233 |
| 5,792,549 | A | * | 8/1998 | Wilkie | 428/215 |
| 5,888,714 | A | | 3/1999 | Bourdelais et al. | 430/536 |
| 6,074,731 | A | * | 6/2000 | Wilkie | 428/215 |
| 6,087,015 | A | * | 7/2000 | Cretekos et al. | 428/447 |
| 6,258,464 | B1 | * | 7/2001 | Negi et al. | 428/516 |

FOREIGN PATENT DOCUMENTS

| | | | |
|---|---|---|---|
| EP | 564846 A1 | | 3/1993 |
| JP | 10-15844 | * | 6/1998 |

OTHER PUBLICATIONS

Patent Abstracts of Japan; vol. 1998, No. 11; Sep. 30, 1998 & JP 10 158445 A (Toray Gosei Film KK), Jun. 16, 1998, abstract.

* cited by examiner

*Primary Examiner*—Paul Thibodeau
*Assistant Examiner*—Monique R Jackson
(74) *Attorney, Agent, or Firm*—Dennis P. Santini; Rick F. James

(57) ABSTRACT

The present invention relates to a matte surface film comprising:

(a) a base layer comprising a polyolefin; and (b) a matte surface layer comprising a blend of a non-hydrocarbon polymer with at least one incompatible polyolefin, wherein said non-hydrocarbon polymer includes monomeric units with polar functional groups. The film may be used for packaging and label applications.

12 Claims, No Drawings

MATTE SURFACE FILM

FIELD OF THE INVENTION

The present invention relates to a matte surface film. More particularly, the present invention relates to a multilayer polyolefin matte surface film including a non-hydrocarbon polymer blended with a polyolefin polymer.

BACKGROUND OF THE INVENTION

Matte surface films have a variety of useful purposes. Primarily, they form a good background for displaying printed or artful images on the film. The images can be printed onto the matte surface film by any conventional plastic printing process.

Mobil Chemical Company film product "70 MLT" is a matte surface biaxially oriented multilayer film. The base layer is oriented polypropylene and the matte surface skin layer comprises a mixture of polyethylenes and an ethylene-propylene-butene-1 terpolymer. The matte surface film has a dull surface appearance; that is, it is not shiny or glossy. Such a surface appearance is not typical of most biaxially oriented films used in packaging but is advantageous in that it provides an unusual appearance when reverse printed on the side opposite to the matte surface.

U.S. Pat. No. 5,492,757 to Schuhmann, et al. discloses an opaque, matte, multilayer polypropylene film having at least one base layer and at least one interlayer, and an outer layer applied to this interlayer. The base layer includes polypropylene and fillers. The interlayer includes a mixture or blend of two components I and II, wherein component I is a propylene homopolymer or a copolymer of α-olefins having 2 to 10 carbon atoms, or a terpolymer of α-olefins having 2 to 10 carbon atoms, or a mixture or blend of these polymers and component II is a high density polyethylene (HDPE) or a blend of HDPE and a propylene homopolymer or copolymer of a copolymer of α-olefins having 2 to 10 carbon atoms, or a terpolymer of α-olefins having 2 to 10 carbon atoms, or a mixture or blend of these polymers. The outer layer essentially includes a copolymer of α-olefins having 2 to 10 carbon atoms, or a terpolymer of α-olefins having 2 to 10 carbon atoms, or a mixture or blend of these polymers.

U.S. Pat. No. 5,494,717 to Peiffer, et al. discloses a heat-sealable, shrinkable multilayer film which comprises at least one base layer containing a propylene polymer or a propylene polymer mixture and at least one outer layer which comprises a mixture or blend of two components I and II, wherein the mixture contains copolymers or terpolymers of α-olefins having 2 to 10 carbon atoms and HDPE.

U.S. Pat. No. 5,496,600 to Peiffer, et al. discloses a multilayer polypropylene film which contains at least one base layer containing polypropylene or a polypropylene mixture and resin, and at least one outer layer which contains a mixture or blend of two components I and II.

U.S. Pat. No. 5,516,563 to Schumann, et al. discloses an opaque, matte, multilayer polypropylene film including at least one base layer comprising polypropylene or a polypropylene mixture and fillers, and at least one outer layer which contains a mixture or blend of two components I and II.

Similarly, U.S. Pat. No. 5,618,369 to Peiffer, et al. discloses a matte multilayer polypropylene film which includes at least one base layer containing polypropylene and migrating additives or a mixture of migrating additives, and at least one outer layer which includes a mixture or blend of two components I and II.

SUMMARY OF THE INVENTION

The present invention is directed to a matte surface film comprising:

(a) a base layer comprising a polyolefin; and (b) a void free matte surface layer comprising a blend of a non-hydrocarbon polymer with at least one incompatible polyolefin, wherein said non-hydrocarbon polymer includes monomeric units with polar functional groups; and wherein said blend comprises at least 12 wt % of said non-hydrocarbon polymer.

In a preferred embodiment of the present invention, the blend of the incompatible polymers contained in the matte surface layer comprises (i) a propylene homopolymer or propylene interpolymer and (ii) an ethylene vinyl alcohol copolymer.

DETAILED DESCRIPTION OF THE INVENTION

The matte surface layer is formed by providing a blend of two or more incompatible polymers. One of these incompatible polymers includes a non-hydrocarbon polymer. By the expression, non-hydrocarbon polymer, it will be understood that such a polymer includes at least one element other than hydrogen or carbon. In particular, these non-hydrocarbon polymers will include one or more monomeric units with at least one polar functional group. It will be understood that these non-hydrocarbon polymers are formed from monomers, wherein at least some of these monomers have polar functional groups.

Examples of such polar functional groups include hydroxy (OH), amide (CONH), carboxyl (COOH), acid anhydride [C(O)O(O)C], ester, carbonate, ketone and halogen.

Examples of particular non-hydrocarbon polymers include polyvinyl alcohol (PVOH); ethylene-vinyl alcohol copolymers (EVOH); ethylene-vinyl acetate copolymers (EVA); ethylene-vinyl acetate-vinyl alcohol copolymers; polyamides, especially nylons; polyesters, such as polyethylene terephthalate (PET) and polyethylene terephthalate/glycol (PETG); polycarbonate; maleic anhydride modified polyolefins; and polyvinyl chloride (PVC). A particular example of such a polymer is an ethylene-vinyl acetate-vinyl alcohol copolymer polymer identified as ECG-156B from EVAL Company of America. ECG-156B has a specific gravity of about 1.12, has a melting point of about 160° C. and contains about 48 mol % of ethylene.

As pointed out in U.S. Pat. No. 5,888,714 to Bourdelais, et al., particularly at column 4, lines 25–67, certain polymers can become void-initiating materials when blended with other polymers. Examples of such blends include certain nylons or certain types of polybutylene terephthalate dispersed in certain types of polypropylene. These blends are melt-mixed and the dispersed polymer forms dispersed spherical particles as the mix is cooled. When an extruded film of such a cooled mix is then stretched, the matrix polymer breaks away from the spherical particles, generating voids or cavities in the film.

In the present matte surface films, the formation of voids or cavities is avoided by proper selection of materials and conditions. For example, when the non-hydrocarbon polymer is present as more of a major component of the blend, the melted mix tends to form more of a continuous phase. In particular, depending on the choice of materials, the non-hydrocarbon polymer could form discrete beads or dispersed spheres at concentrations of less than 8 wt % of the blend.

Furthermore, such beads or spheres may be too hard or too small to deform upon stretching such that the matrix polymer breaks away to form voids. At non-hydrocarbon polymer concentrations of 12 wt % or more, such discrete beads or dispersed spheres may have less of tendency to form, and to the extent that they do form, they are large enough to stretch along with the matrix polymer without forming voids. Preferred blends for forming the present matte surface films include those with 20 wt % or more of non-hydrocarbon polymer. For example, the blends may have 20 to 80 wt % of non-hydrocarbon polymer and 20 to 80 wt % of polyolefin.

Void formation can also be avoided by selecting a non-hydrocarbon polymer with a melting point nearly the same or less than the melting point of the matrix polymer. Therefore, preferred non-hydrocarbon polymers in the present matte surface films have a melting point of no greater than 10° C. higher than the melting point of the polyolefin. In contrast, void initiating polymers described in U.S. Pat. No. 5,888,714 to Bourdelais, et al., include cross-linked polymers.

To the extent that cross-linked polymers have melting points, such melting points tend to be extremely high. Often, cross-linked polymers do not melt, but they start to decompose at high temperature. Examples of non-hydrocarbon polymers in the present matte surface films have a melting point of no greater than 240° C.

The non-hydrocarbon polymer and polyolefin in the matte surface film are incompatible in the sense that they separately solidify or crystallize, usually at different rates, upon cooling to form a heterogeneous film. This separate solidification or crystallization process is believed to be responsible for the generation of the roughened or matte surface of the film. In particular, different polymers tend to shrink in volume to different degrees upon solidification or crystallization.

The polyolefin of the base layer and the polyolefin in the matte surface layer may be the same or different. These polyolefins may be homopolymers or interpolymers. For purposes of the present invention, the term "interpolymer" includes various polymers other than homopolymers, such as random copolymers, terpolymers, etc., as well as block polymers, graft polymers, etc. Examples of such polyolefins include homopolymers, such as polyethylene (PE) and polypropylene (PP), copolymers, such as ethylene-propylene (EP), and terpolymers, such as terpolymers of ethylene, propylene and a C4 to C10 alpha-olefin, especially an ethylene-propylene-butylene (EPB) terpolymer. Blends of polyolefin polymers may be used in either or both of the base layer and the matte surface layer.

Particular polyolefins which can be used in the base layer or matte surface layer include polypropylene, such as Fina 3371, and high density polyethylene (HDPE). Particular HDPE polymers include HDPE M-6211 and HDPE M-6030 sold by Lyondell Chemical Company, as well as HD-6704.67 sold by Exxon Chemical Company.

Copending U.S. Pat. No. 6,322,894, filed May 7, 1999, describes a matte surface film with easy or improved cuttability. The easy or improved cuttability of the matte surface film is achieved by providing a base layer comprising a HDPE. The HDPE may have a density of about 0.940 to about 0.980 g/cm$^3$, a melting point of about 115 to about 140° C., and a melt index of about 0.5 to about 12 g/10 minutes (measured in accordance with ASTM D1238 under a load of 2.16 kg at 190° C.). In particular, the HDPE contained in the base layer has a density of about 0.950 to about 0.970 g/cm$^3$, a melting point of about 120 to about 134° C., and a melt index of about 1 to about 6 g/10 minutes.

When a copolymer of ethylene and propylene or a terpolymer of ethylene, propylene and a $C_4$ to $C_{10}$ alpha-olefin are used in the matte surface layer, the copolymer or terpolymer may be comprised predominantly of propylene. Such copolymer or terpolymer, may contain more than about 80% propylene.

Ethylene or propylene homopolymers may include a copolymer or a blend of different kinds of ethylene or propylene polymers. For example, the ethylene polymer may be a blend of two or more ethylene polymers each having different densities. In one embodiment, the ethylene polymer comprises at least a first ethylene polymer having a density of at least about 0.91 g/cm$^3$ and a second ethylene polymer having a density which is different from the density of the first ethylene polymer. For example, the blend may comprise high density polyethylene and low density polyethylene or linear low density polyethylene. The ratio of the blend will vary depending upon the polyethylene components of the blend and the desired characteristics of the layered film. For example, a blend in which an equal proportion of each component may be employed, such as a 50:50 blend. Examples of another blend is 50% ethylene-propylene-butene-1 terpolymer, 40% high density polyethylene (0.95 g/cm$^3$), and 10% of a lower density polyethylene (approx. 0.92 g/cm$^3$).

Specific examples of polymer blends are described in U.S. Pat. Nos. 4,487,871; 4,508,786 or 5,451,468.

Commercially available polyolefins which may be used in one or more layers of the present matte surface film include XPM-7510 ethylene-propylene-butene-1 terpolymer sold by Chisso Corporation, PE-1845 low density polyethylene sold by Dow Chemical Company, and Fina 3371 polypropylene.

The matte surface layer may also include a particular polydialkylsiloxane additive. The polydialkylsiloxane additive is especially selected because it reduces the friction between the matte surface and the machine surfaces with which the matte surface comes into contact during processing while maintaining the "matte" appearance of the film. The polydialkylsiloxane additive also reduces the accumulation of resin on the die surfaces during extrusion, which minimizes this resin accumulation, commonly referred to as "die drool." This is useful because it reduces the frequency for die cleaning and the chance for film breakage.

It is possible that an incompatible blend of polymers of the matte surface layer may result in "die drool", because the lower molecular weight or lower melting point materials may migrate to the die surface and form a deposit which builds-up over time. The polydialkylsiloxane additive mitigates this effect.

The polymer blend of the matte surface layer may be compounded with an amount of a polydialkylsiloxane sufficient to reduce friction when the film is formed or when it is manipulated in packaging machinery.

The polydialkylsiloxane may be selected from the group consisting of (1) a polydialkylsiloxane having a number average molecular weight above about 250,000, typically above about 300,000 and a viscosity of above about 10,000,000 cSt., usually ranging from about 15,000,000 to about 20,000,000 cSt., or (2) a polydialkylsiloxane functionalized polyolefin.

The alkyl group of the polydialkylsiloxane usually ranges from 1 to about 10 carbon atoms, more usually from 1 to about 3 carbon atoms, which carbon atoms can be in a straight or branched chain configuration.

When the polydialkylsiloxane is (2), a polydialkylsiloxane functionalized polyolefin, the polyolefin may contain about 2 to about 4 carbon atoms which are usually in the form of a homopolymer. The polydialkylsiloxane may be grafted onto a polypropylene or polyethylene backbone. However, a copolymer, such as ethylene-propylene copolymer or ethylene-propylene-butene-1 terpolymer may be used. A commercially available polydialkylsiloxane functionalized polyolefin is available from DuPont under the trademark "Bynel" 2045-174-01.

One particular kind of polydialkylsiloxane is referred to as "silicone gum," also described as an "ultra high molecular weight silicone." Silicone gum can be in the form of a silicone polymer dispersed in polypropylene. Silicone gum of this kind is available in a masterbatch form from the Dow Corning Corporation, of Midland Mich., under the product designation "MB50-001" which contains 1.25% silicone.

The ratio of polydialkylsiloxane to the polymer blend of the matte surface layer is, typically, very low and in an amount sufficient to improve machinability of the matte surface layer. While the ratio of the polydialkylsiloxane to the polyolefin will vary, for example, depending upon the nature of the polydialkylsiloxane and the nature of the olefinic component, the polydialkylsiloxane content may range from about 0.05 to about 10 weight percent, for example, about 0.1 to about 1 weight percent based on the total weight of the matte surface layer.

On a side of the base layer opposite to the side on which the matte surface layer is situated, there may be a film-forming polymer having properties appropriate for extrusion and uniaxial or biaxial orientation (by stretching the extrudate in the machine direction and/or transverse direction under elevated temperatures) and for forming a skin layer. Such a layer usually comprises a thermoplastic polymer, which may be composed predominantly of an olefinic polymer such as propylene homopolymer, ethylene homopolymer, propylene or ethylene copolymer or terpolymer of propylene, ethylene and a $C_4$ to $C_{10}$ alpha-olefin. This thermoplastic polymer layer may be a copolymer or terpolymer of ethylene, propylene and butylene or another olefin having 5 to 10 carbon atoms or a mixture of these olefin polymers. It may be the same or different from the layer which provides the matte surface. When it is desirable for this layer to be printable, sealable, or treatable for printing or sealing, this layer may be comprised of an ethylene homopolymer having a density of about 0.91 to about 0.96 g/$cm^3$, ethylene-propylene copolymer in which the ethylene content is about 2 to 10% by weight based upon the total weight of the copolymer or an ethylene-propylene-butene-1 terpolymer in which the ethylene content is about 0.5 to about 7 weight % ethylene and the butylene content is about 5 to about 30 weight %, each based upon the total weight of the terpolymer.

Film properties may be enhanced or the film may be provided with certain properties by use of appropriate film additives. Such additives are used in effective amounts, which vary depending upon the property required. These additives may be selected from the group consisting of: antiblock, slip additive, antioxidant additive, moisture barrier additive or gas barrier additive. These additives may be included in the base layer, the matte surface layer, or any other layer.

Useful antistatic additives which can be used in amounts ranging from about 0.05 to about 3 weight %, based upon the weight of the layer, include alkali metal sulfonates, polyether-modified polydiorganosiloxanes, polyalkylphenylsiloxanes and tertiary amines.

Useful antiblock additives used in amounts ranging from about 0.1 weight % to about 3 weight % based upon the entire weight of the layer include inorganic particulates such as silicon dioxide, e.g. a particulate antiblock sold by W.R. Grace under the trademark "SIPERNAT 44," calcium carbonate, magnesium silicate, aluminum silicate, calcium phosphate, and the like, e.g., KAOPOLITE. Another useful particulate antiblock agent is referred to as a non-meltable crosslinked silicone resin powder sold under the trademark "TOSPEARL" made by Toshiba Silicone Co., Ltd. and is described in U.S. Pat. No. 4,769,418. Another useful antiblock additive is a spherical particle made from methyl methacrylate resin having an average diameter of 1 to 15 microns, such an additive is sold under the trademark "EPOSTAR" and is commercially available from Nippon Shokubai.

Slip additives include higher aliphatic acid amides, higher aliphatic acid esters, waxes and metal soaps which can be used in amounts ranging from about 0.1 to about 2 weight percent based on the total weight of the layer. A specific example of a useful fatty amide slip additive is erucamide.

A conventional silicone oil additive having a viscosity of 10,000–60,000 cSt. is also contemplated.

Useful antioxidants, such as phenolic antioxidants, are generally used in amounts ranging from about 0.1 weight % to about 2 weight percent, based on the total weight of the layer. One useful antioxidant is commercially available under the trademark "Irganox 1010".

Barrier additives may be used in useful amounts and may include low-molecular weight resins, hydrocarbon resins, particularly petroleum resins, styrene resins, cyclopentadiene resins and terpene resins.

Optionally, the outer layers are compounded with a wax for lubricity. Amounts of wax range from about 2 to about 15 weight % based on the total weight of the layer. Any conventional wax useful in thermoplastic films is contemplated.

The process of making the matte surface layer can be by masterbatch in which a minor proportion of a concentrated composition of polydialkylsiloxane and the matte surface thermoplastic polymer blend, along with any optional additives is prepared and mixed (usually by dry mixing) into a major proportion of the matte surface forming thermoplastic polymer blend. The amount of concentrate in the masterbatch may range from about 5% by weight to about 50% by weight based on the total weight of the matte surface layer. The mixture is then melt mixed in an extruder or compounded in a twin screw extruder. Alternatively, the matte surface layer is prepared in one step by mixing the thermoplastic polymer blend, polydialkylsiloxane and, optionally, by any additives in the proportions used for making up the final matte surface layer composition.

The matte surface film may be formed by coextruding the polyolefin base layer together with the matte surface layer and any additional layer through a flat sheet extruder die at a temperature ranging from between about 200 to about 270° C., casting the film onto a cooling drum and quenching the film. The sheet may then be stretched about 4 to about 8 times in the machine direction (MD) orienter followed by stretching about 6 to about 10 times in the transverse direction (TD) orienter. The film is then wound onto a reel. Optionally, one or both of the external surfaces are coated and/or flame treated or corona treated before winding.

The film of the present invention may comprise two or three layers: the base layer; the matte surface layer (usually an outermost skin layer); and optionally another layer (also usually the other outermost skin layer) which is on the other side of the base layer opposite to the matte surface layer. Additional layers can be incorporated between the core layer and the outermost skin layers, e.g., tie layers comprising various polymers (e.g., polypropylene or polyethylene). The base layer may represent about 70 to about 97 percent of the thickness of the total film. The skin layers may be coextensively applied to each major surface of the base layer, for example, by coextrusion, as noted above. The skin layers may not, ultimately, be the outermost layers of a final film product which includes the matte surface film.

The film may be used as a packaging film or as a printed film. The film may be printed by any conventional means, such as letterpress, offset, silk screen, electrostatic and photographic methods. Specific printing methods contemplated include thermal dye transfer (including dye sublimation), lithographic printing, flexographic printing, gravure printing, hot stamping, valley printing, roll-leaf printing and spanishing. Polyolefins are normally treated before printing in order to make them receptive to inks. Treating methods include casing, electronic treating and flame treating.

EXAMPLES

In each of the following Examples, various properties, including the haze and gloss, of the film are determined. The haze (%) is measured in accordance with ASTM D1003, and the gloss (at a 45° angle) is measured in accordance with ASTM D2457.

COMPARATIVE EXAMPLE 1

This Comparative Example demonstrates the preparation of a matte surface film without the use of a non-hydrocarbon polymer.

A three-layer oriented film comprising a base layer B, a matte surface layer A, and another layer C in an A/B/C configuration was produced. The base layer B was made of M-6211 HDPE resin from Lyondell having a melt index of 1.1 g/10 minutes, a density of 0.958 g/cm$^3$, and a melting point of 130° C. The matte surface layer A was a blend of 50% by weight of a HDPE with about 50% by weight of a conventional ethylene-propylene-butene-1 terpolymer. Specifically, the HDPE had a melting point of about 132 to about 134° C., a melt index of about 0.1 to 0.2 g/10 minutes, and a density of about 0.955 g/cm$^3$. The ethylene-propylene-butene-1 terpolymer mainly comprised propylene units with about 10% by weight or less of ethylene and 10% by weight or less of butene-1, and had a melting point of about 122 to about 126° C. The third layer C was made of Chisso XPM-7510 EPB terpolymer, which is mainly comprised of propylene units with about 10% by weight or less of ethylene and 10% by weight or less of butene-1, with a melting point of about 122 to about 126° C. The three layers were coextruded through a flat sheet extruder die at a temperature of about 230° C., cast onto a cooling drum maintained at 40° C., and then quenched at 40° C. The sheet was then stretched about 5 times in the machine direction (MD) orienter at 105° C. and then about 8 times in the transverse direction (TD) orienter at 160° C.

The matte surface was smooth to the touch and felt like ground glass. Further properties of the film are reported in Table 1.

COMPARATIVE EXAMPLE 2

Comparative Example 1 was repeated, except a different resin blend was used to form the matte surface layer A. A blend of 33 wt % of PE-1845, which is a low density polyethylene having a density of 0.905 g/cm$^3$, sold by Dow Chemical Company; 34 wt % PP 3371, which is a polypropylene having a melt flow rate of 2.8 g/10 minutes, sold by Fina Oil and Chemical Company; 33 wt % M-6030, which is a high density polyethylene having a density of 0.96 g/cm$^3$, sold by Lyondell; and 10 wt % of SYLISIA-340, which is a synthetic silica available from Fuji-Silysia Chemical Company.

The matte surface is rougher than the Example 1 film, with valleys and hills to the touch. Further properties of the film are shown in Table 1.

COMPARATIVE EXAMPLE 3

Comparative Example 2 was repeated except the resin to produce the base layer B was replaced with M-6030, which is a HDPE from Lyondell Chemical Company.

The matte surface showed the same appearance as the matte surface of the Example 2 film. Further properties of the film are reported in Table 1.

EXAMPLE 4

Comparative Example 2 was repeated, except the resin blend for the matte surface layer was replaced with a blend of 40% by weight of Chisso XPM-7510 ethylene-propylene-butene-1 terpolymer; 40 wt % of ECG-156B, which is an ethylene-vinyl acetate-vinyl alcohol copolymer polymer identified as ECG-156B from EVAL Company of America.; and 20 wt % of Mistui Admer 1179E, which is a maleic anhydride modified polypropylene resin with a specific gravity of 0.90 and a melting point of about 150° C. ECG-156B has a specific gravity of about 1.12, has a melting point of about 160° C. and contains about 48 mol % of ethylene.

The matte surface was even rougher than the matte surface in Example 3, with more valleys and hills, like fine sandpaper. Further results are shown in Table 1.

EXAMPLE 5

Example 4 was repeated, except the resin blend for the matte surface layer was replaced with a blend of 60% by weight of M-6360 HDPE; 30 wt % of ECG-156B EVOH/EVA copolymer; and 10 wt % of Mistui Admer 1179E.

The matte surface was smooth as the surface in Example 1, but even higher haze and lower gloss was attained. Further results are shown in Table 1.

COMPARATIVE EXAMPLE 6

This Comparative Example demonstrates that low gloss and high haze is not achieved when incompatible polyolefin is omitted from surface layer A.

Comparative Example 1 was repeated, except that the composition of all three layers was changed. The base layer B was made of Fina PP 3371 polypropylene. The surface layer A was made of QF500A, which is a maleic anhydride modified polypropylene resin from Mitsui. The third layer C was made of Fina PP 3371 polypropylene.

Properties of the film are reported in Table 1.

EXAMPLE 7

Comparative Example 6 was repeated, except that the surface layer A was a matte surface layer formed from a blend of 60% by weight of HD-6704.67 HDPE with a density of 0.954 and a melt index of about 4.5, sold by Exxon; 20 wt % of ECG-156B EVOH/EVA copolymer; and 20 wt % of Mistui QF500A.

Properties of the film are listed in Table 1.

EXAMPLE 8

Example 7 was repeated, except that the matte surface layer was replaced with a blend of 60% by weight of HD-6704.67 HDPE from Exxon; 20 wt % of ECG-156B EVOH/EVA copolymer; and 20 wt % of Polybond 3200, which is a maleic anhydride modified polypropylene resin with a melting point of 157° C. and a specific gravity of 0.90, sold by Uniroyal Chemical Co.

Properties of the film are listed in Table 1.

EXAMPLE 9

Example 7 was repeated, except that the Mitsui QF500A in the matte surface layer was replaced with the same weight percent of Bynel CXA 50E571, which is a maleic anhydride modified polyolefin blend, sold by DuPont.

Properties of the film are listed in Table 1.

EXAMPLE 10

Example 7 was repeated, except that the Mitsui QF500A in the matte surface layer was replaced with the same weight percent of Polybond 3150, which is a maleic anhydride modified polypropylene resin with a melting point of 160° C. and a specific gravity of 0.90, sold by Uniroyal Chemical Company.

Properties of the film are listed in Table 1.

EXAMPLE 11

Example 7 was repeated, except that the Mitsui QF500A in the matte surface layer was replaced with the same weight percent of Plexar 5118 resin, which is a blend of polyolefin resins with a density of 0.92 to 0.95, sold by Quantum Chemical Corp.

Properties of the film are listed in Table 1.

EXAMPLE 12

Example 7 was repeated, except that the Mitsui QF500A in the matte surface layer was replaced with the same weight percent of Mitsui 1152A, which is a maleic anhydride modified polyethylene with a specific gravity of 0.91 and a melting point of 125° C., sold by Mitsui, and the HD-6704.67 HDPE in the matte surface layer was replaced with the same weight percent of Amoco 9218, which is a highly crystalline polypropylene, sold by BP-Amoco.

Properties of the film are listed in Table 1.

COMPARATIVE EXAMPLE 13

Example 12 was repeated, except that the EVOH (ECG-156) in the matte surface layer was replaced with the same weight percent of Amoco 9218.

Properties of the film are listed in Table 1.

EXAMPLE 14

Samples were also produced through an in-line extrusion coating process. The extrusion coated skin material included EVOH/HDPE, EVOH/LDPE and EVOH/PP, all at 50/50 blends. All of the samples containing >20 wt % of EVOH in the skin showed matte film surface texture.

TABLE 1

| Example | Film Structure | Haze[1] (%) | Gloss[2] (45°) |
|---|---|---|---|
| C. Ex. 1 | 50-50 blend of HDPE and EPB/HDPE M-6211/XPM-7510 | 39 | 23 |
| C. Ex. 2 | 30-34-33-3 blend of PE-1845, PP-3371, HDPE M-6030 and Sylysia-430/HDPE M-6211/XPM-7510 | 38 | 18 |
| C. Ex. 3 | 30-34-33-3 blend of PE-1845, PP-3371, HDPE M-6030 and Sylysia-530/HDPE M-6211/XPM-7510 | 40 | 19 |
| Ex. 4 | 40-40-20 blend of XPM-7510, EVOH ECG-156 B and 1179E/HDPE M-6211/XPM-7510 | 39 | 25 |
| Ex. 5 | 60-30-10 blend of M-6030, EVOH ECG-156B and 1179E/HDPE M-6211/XPM-7510 | 61 | 10 |
| C. Ex. 6 | QF500A/PP/PP | 4 | 89 |
| Ex. 7 | 60-20-20 blend of HDPE 6704.67, EVOH ECG-156B and QF 500A/PP/PP | 42 | 20 |
| Ex. 8 | 60-20-20 blend of HDPE 6704.67, EVOH ECG-156B and Polybond 3200/PP/PP | 49 | 16 |
| Ex. 9 | 60-20-20 blend of HDPE 6704.67, EVOH ECG-156B and Bynel 50E571/PP/PP | 42 | 21 |
| Ex. 10 | 60-20-20 blend of HDPE 6704.67, EVOH ECG-156B and Polybond 3150/PP/PP | 43 | 20 |
| Ex. 11 | 60-20-20 blend of HDPE 6704.67, EVOH ECG-156B and Quantum PX 5118/PP/PP | 58 | 18 |
| Ex. 12 | 60-20-20 blend of PP Amoco 9218, EVOH ECG-156B and Mitsui 1152A/PP/PP | 46 | 20 |
| C. Ex. 13 | 80-20 blend of PP Amoco 9218 and Mitsui 1152A/PP/PP | 8 | 70 |

[1]ASTM D1003
[2]ASTM D2457

For a matte film, high haze (roughly >30%) and low gloss (roughly <25%) are preferred. Based on the data in the above Examples and in Table 1, films can be produced with controlled roughness, haze and gloss.

What is claimed is:

1. A matte surface film comprising:

(a) a base layer comprising a polyolefin; and (b) a void free matte surface layer comprising a blend of at least three polymers comprising: a non-hydrocarbon polymer selected from the group consisting of polyvinyl alcohol, ethylene-vinyl alcohol copolymers, ethylene-vinyl acetate-vinyl alcohol copolymers, polyesters, polycarbonate, and polyvinyl chloride; an incompatible polyolefin; and a maleic anhydride modified polyolefin, wherein said non-hydrocarbon polymer includes monomeric units with polar functional groups and has a melting point no more than 10° C. greater than the melting point of the incompatible polyolefin; and wherein said blend comprises at least 12 wt % of said non-hydrocarbon polymer.

2. A matte surface film according to claim 1, wherein said base layer comprises polypropylene or high density polyethylene (HDPE).

3. A matte surface film according to claim 1 which is biaxially oriented and wherein said film has a haze, as measured by ASTM D1003, of greater than 30% and a gloss, as measured by ASTM D2457, of less than 25%.

4. A matte surface film according to claim 1, wherein said polar functional groups are hydroxy groups.

5. A matte surface film according to claim 1, wherein said non-hydrocarbon polymer is selected from the group consisting of polyvinyl alcohol, ethylene-vinyl alcohol copolymers, and ethylene-vinyl acetate-vinyl alcohol copolymers.

6. The matte surface film as claimed in claim 1, wherein the matte surface layer comprises a polydialkylsiloxane;

wherein said blend comprises from 20 to 30 wt % of non-hydrocarbon polymer and from 20 to 80 wt % of polyolefin.

7. The matte surface film as claimed in claim 1, wherein at least one layer of said matte surface film further comprises an additive selected from the group consisting of antistatic agents, antiblock agents, slip additives, silicone oil having a viscosity of 10,000–60,000 centistokes, antioxidants, barrier additives, and wax.

8. The matte surface film as claimed in claim 1, further comprising an outer layer located on a side of the base layer opposite to the matte surface layer.

9. The matte surface film as claimed in claim 1, further comprising at least one tie layer.

10. A packaging film or a printed film comprising the matte surface film as defined in claim 1.

11. A process for producing a matte surface film comprising the steps of:

(a) coextruding a polyolefin base layer together with a surface layer comprising a blend of three or more polymers through a flat sheet extruder die at a temperature ranging from between about 200 to about 270° C., wherein said polymers comprise a non-hydrocarbon polymer selected from the group consisting of polyvinyl alcohol, ethylene-vinyl alcohol copolymers, ethylene-vinyl acetate-vinyl alcohol copolymers, polyesters, polycarbonate, and polyvinyl chloride; an incompatible polyolefin; and a maleic anhydride modified polyolefin; wherein said non-hydrocarbon polymer includes monomeric units with polar functional groups; and has a melting point no more than 10° C. greater than the melting point of the incompatible polyolefin and wherein said blend comprises at least 12 wt % of said non-hydrocarbon polymer;

(b) casting the film onto a cooling drum;

(c) quenching the film; and (d) stretching the film in at least one direction without generating voids in said surface layer.

12. The process of claim 11 wherein said non-hydrocarbon polymer is selected from the group consisting of polyvinyl alcohol, ethylene-vinyl alcohol copolymers, and ethylene-vinyl acetate-vinyl alcohol copolymers.

* * * * *